Patented Nov. 21, 1933

1,936,181

UNITED STATES PATENT OFFICE 1,936,181

SEPARATING SOLID HYDROCARBONS FROM LIQUID HYDROCARBONS

Clarence A. Ward, Linden, N. J., assignor to Standard Oil Development Company, a corporation of Delaware No Drawing. Application December 5, 1923
Serial No. 678,554

1 Claim. (Cl. 196—18)

This invention relates to the art of separating waxy hydrocarbons from hydrocarbon oils, and will be fully understood from the following description.

In refining petroleum oils, some fractions under preparation for lubricating oils contain more or less of waxy constituents. Where these constituents are of a crystalline character, separation is readily attained by cooling and filter-pressing. In cases however where amorphous constituents are present and crystallization is interfered with, great difficulties have been encountered.

In accordance with the present invention an oil or fraction which is not ordinarily amenable to the direct cooling and filter-pressing, is, where necessary, thinned with a miscible thinning agent, as a lighter hydrocarbon or a lighter distillate, for example one or more volumes of naphtha, and is chilled in a suitable container. A finely divided solid material, such for instance as infusorial earth or a clay is added and agitated with the liquid and is then allowed to settle in the cold. The amount of divided solid to be added depends somewhat upon the particular oil, and desirably is sufficient to provide a well-distributed suspension through the liquid before settling is allowed to occur. As an example, in the case of lubricating distillate taken by distillation from reduced Mid-continent petroleum, the addition of infusorial earth in the proportion of 8-10 lbs. per barrel of liquid treated has been satisfactory. The temperature during settling is maintained sufficiently low to favor chilling the waxy constituents out of solution; that is, lower than 32° F., and in practice preferably between 0° and 10° F.

The added suspended solid matter appears to provide a contact or surface action preferential to the waxy constituents, crystallizable and amorphous, and in gradually settling down collects these constituents out of the suspended state, apparently as coating on the particles, and the finally settled sediment contains the waxy constituents, while the clear oil stands above. This oil is then withdrawn from the sediment, by siphoning off above or filtering down below, and the naphtha or other thinning agent therein may be separated by distilling off. The waxy constituents may be dissolved out of the sediment by a suitable solvent, for instance naphtha at an appropriate temperature, preferably in successive washes, and from the collected wash solvent the waxy constituents may be recovered by distilling off the solvent to leave the wax.

By turning the distilled-off naphtha back into use with fresh oil and re-using the washed infusorial earth or equivalent, the process may be carried on cyclically and conveniently.

While in describing my invention I have referred to certain specific details, it will be understood that these are illustrative and not limitative; nor is the invention to be regarded as dependent upon the accuracy of any suggestions of theory advanced in the effort to make the invention clear, but the invention is to be considered as limited only as defined in the following claim, in which it is my intention to claim all inherent novelty as broadly as the prior art permits.

What I claim is:

In the removal of wax from a diluted wax-containing oil, the improvement which comprises chilling the diluted oil, then mixing the same while chilled with a finely divided granular material in the proportion of about 8 to 10 lbs. per barrel of liquid to be treated, settling the oil while maintaining a temperature between 0° and 10° F., withdrawing the oil from which wax and said granular material have settled out, and removing the diluent from the oil.

CLARENCE A. WARD.